US012197504B2

(12) United States Patent
Ganhotra et al.

(10) Patent No.: US 12,197,504 B2
(45) Date of Patent: Jan. 14, 2025

(54) TECHNIQUES FOR PREDICTING A PERSONALIZED URL DOCUMENT TO ASSIST A CONVERSATION

(71) Applicant: INTERNATIONAL BUSINESS MACHINES CORPORATION, Armonk, NY (US)

(72) Inventors: Jatin Ganhotra, Jersey City, NJ (US); Nathaniel Mills, Coventry, CT (US); Chulaka Gunasekara, New Hyde Park, NY (US); Kshitij Fadnis, Astoria, NY (US); Sachindra Joshi, Gurgaon (IN); Luis A. Lastras-Montano, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 105 days.

(21) Appl. No.: 17/660,235

(22) Filed: Apr. 22, 2022

(65) Prior Publication Data

US 2023/0342397 A1 Oct. 26, 2023

(51) Int. Cl.
*G06F 16/9032* (2019.01)
*G06F 16/906* (2019.01)
(Continued)

(52) U.S. Cl.
CPC ...... *G06F 16/90332* (2019.01); *G06F 16/906* (2019.01); *G06F 16/9566* (2019.01); *G06F 40/205* (2020.01); *G06F 40/35* (2020.01)

(58) Field of Classification Search
CPC ............. G06F 16/90332; G06F 16/906; G06F 16/9566; G06F 40/35; G06F 40/205
See application file for complete search history.

(56) References Cited

U.S. PATENT DOCUMENTS 7,127,495 B2 10/2006 Brown et al.
7,542,902 B2 6/2009 Scahill
(Continued)

FOREIGN PATENT DOCUMENTS

WO 2014201537 A1 12/2014
WO 2020142803 A1 7/2020

OTHER PUBLICATIONS

Fadnis et al., "Agent Assist through Conversation Analysis," ACL Anthology, Proceedings of the 2020 EMNLP (Systems Demonstrations), Nov. 16-20, 2020, https://aclanthology.org/2020.emnlp-demos.20.pdf, pp. 151-157.

(Continued)

*Primary Examiner* — Taelor Kim
(74) *Attorney, Agent, or Firm* — Lily Neff

(57) ABSTRACT

A method, computer system, and a computer program for conducting a conversational search. In one embodiment, the method includes monitoring a dialogue involving at least one user and capturing user utterances provided during the dialogue. These user utterances are then analyzed and classified according to the context of the dialogue. The dialogue is intervened upon the determination that a user needs additional information and/or upon execution of an action on behalf of the user and based on the plurality of user utterances and context. The Required information may be provided back to the user using Documentation Recommendation Module. The Documentation Recommendation Module determines a valid resource recommendation as determined by a combination of the context and a resource that includes additional information.

18 Claims, 9 Drawing Sheets

(51) Int. Cl.
*G06F 16/955* (2019.01)
*G06F 40/205* (2020.01)
*G06F 40/35* (2020.01)

(56) References Cited

U.S. PATENT DOCUMENTS

| | | | |
|---|---|---|---|
| 7,546,382 | B2 | 6/2009 | Healey et al. |
| 8,411,841 | B2 | 4/2013 | Edwards |
| 8,442,940 | B1 | 5/2013 | Faletti |
| 8,694,645 | B2 | 4/2014 | Mason et al. |
| 8,724,795 | B1 | 5/2014 | Aldrich |
| 9,948,595 | B2 | 4/2018 | Stolorz |
| 2004/0044658 | A1* | 3/2004 | Crabtree ............ G06F 16/9535 |
| 2009/0077037 | A1* | 3/2009 | Wu .................. G06F 16/90324 |
| 2019/0236204 | A1* | 8/2019 | Canim ................ G10L 15/1815 |
| 2021/0203784 | A1* | 7/2021 | Konig .................. G06Q 30/01 |
| 2023/0153540 | A1* | 5/2023 | Galitsky ............ G06Q 30/0631 |
| | | | 704/9 |

OTHER PUBLICATIONS

Ganhotra et al., "Conversational Document Prediction to Assist Customer Care Agents," ACL Anthology, Proceedings of the 2020 Conference on Empirical Methods in Natural Language Processing, Nov. 16-20, 2020, https://aclanthology.org/2020.emnlp-main.25.pdf, pp. 349-356.
IBM, "Install MaaS360," Accessed: Mar. 11, 2022, https://w3.ibm.com/#/support/article/install_maas360, 3 pages.
Mell et al., "The NIST Definition of Cloud Computing", National Institute of Standards and Technology, Special Publication 800-145, Sep. 2011, 7 pages.
Pandit et al., Keyword Extraction and Clustering for Document Recommendation in Conversations, International Journal of Advanced Research in Computer and Communication Engineering, vol. 5, Issue 3, Mar. 2016, pp. 737-740.
Vakulenko et al., "Conversational Browsing", arXiv:2012.03704v1 [cs.IR] Dec. 7, 2020, https://arxiv.org/abs/2012.03704v1, 24 pages.
Yan et al., "DocChat: An Information Retrieval Approach for Chatbot Engines Using Unstructured Documents," ACL Anthology, Proceedings of the 54th Annual Meeting of the Association for Computational Linguistics, Aug. 7-12, 2016, pp. 516-525.

* cited by examiner

TECHNIQUES FOR PREDICTING A PERSONALIZED URL DOCUMENT TO ASSIST A CONVERSATION

BACKGROUND

The present invention relates generally to the field of computer implemented process automation, and more particularly to techniques for predicting user needs based on a computer assisted conversation.

In recent years, with the advent of process implemented computer systems many organizations have integrated automated solutions into their customer service processes. For example, in both health care and banking industries there may be extensive user/customer calls requesting assistance. In response, these organizations have integrated automated solutions such as chatbots into their customer service. These automated solutions may be designed to provide faster and cheaper assistance to the user/clients. The success of these automated solutions, however, are dependent upon the efficiency of performing an automated dialogue and accurately extracting information.

Many developments have been made to allow for the processing of customer calls in a semi-automated manner. However, many of the existing systems only effectively deal with instances where customer requests may be similar. Current prior art does not always address needs that support a successful transaction interaction when the customer requests may be more varied. Consequently, better automated tools may be desired that can be used in a more customized manner to address a variety of specific user needs.

SUMMARY

Embodiments of the present invention disclose a method, computer system, and a computer program for conducting a conversational search. In one embodiment, the method includes monitoring a dialogue involving at least one user and capturing user utterances provided during the dialogue. These user utterances may be then analyzed and classified according to the context of the dialogue. The dialogue may be intervened upon the determination that a user needs additional information and/or upon execution of an action on behalf of the user and based on the plurality of user utterances and context. The Required information may be provided back to the user using Documentation Recommendation Module. The Documentation Recommendation Module determines a valid resource recommendation as determined by a combination of the context and a resource that includes additional information.

In another embodiment, the recommended resources may be provided as part of an output of executing an API call which enables the customization of the construction or recommendation of a URL for the user/customer.

Furthermore, the process can be further enhanced by building a training process that will predict when a resource recommendation will be needed to assist the user in the future. This may be done by continuously monitoring the user utterances and establishing context categories for said utterances; and by recovering any existing previous utterances provided by the user in a previously captured and/or stored dialogue.

One objective for the present embodiments can be providing better automated tools that can be used in a more customized, focused manner.

Another objective may be to predict user needs as they may arise in future conversations and interactions.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
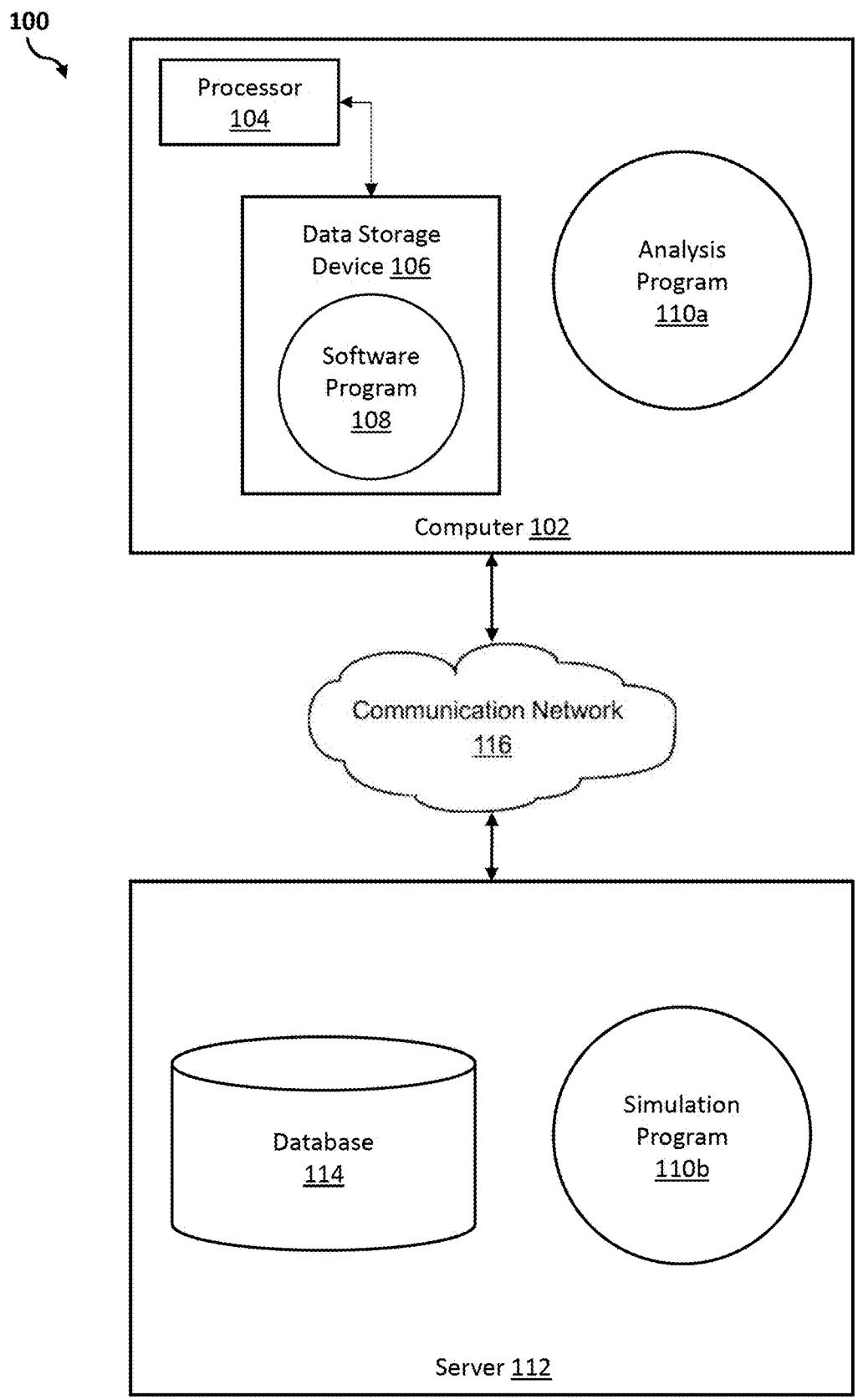
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but may not be limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In recent years, technological advancements such as Artificial Intelligence have enabled automation to help with efficiency of many processes. An important part of automation may be predicting the user/customer's needs and expectations. In one embodiment as will be discussed, the process will drive conversion and retention by predicting a plurality of online visitors' (user/customers) preferences and desires in different ways. For example, in one scenario qualified customers (and/or prospects) can be proactively connected and matched with an appropriate offer or service. This offer can be provided at an opportune time for the customer as per a previous prediction. For example, in one scenario, a customer may be presented with information or even documents only when the customer/user's requires help. At such a time one or more of documents containing domain knowledge will be presented to help customer/user proceed such as to the next task.

In one embodiment, the automation and task prediction may be performed using conversational search techniques. The field of "conversational search" can be a large field that has been developed to automate user/customer needs based on dialogues with the user/customer. In conventional searches of this type, an actual person (agents), may often be involved that will manually extract the keywords from the user utterances from a live or recorded dialogue. Once the search words may be extracted, different storage locations may be then accessed and appropriate documents may be provided, for example using internal search engines. To streamline this process and assist the agents, some prior art processes have automated this to identifying the keywords that need to be searched and provide the supporting documents. In many of these prior art techniques, classifiers may be used based on an input dialogue and a context. The latter will then trigger a search and retrieval of any associated documents with the search (based on either dialogue context/keywords from context).

The current prior art solutions may be effective when the majority of users/customers have common needs, and the scenarios may be mostly the same. For example, in one scenario, the customers may all need to reset their passwords and so the URL and associated documents to provide instructions to the user may be the same. In other words, the needs of the customer/users may be the same and common. They do not change based on the specific user, in this case. However, in circumstances where the needs of the user may be more specific, the current prior art does not work effectively. Consequently, improvements have to be made to this process especially where customer needs may be more user-specific.

The following described exemplary embodiments provide a system, method and program product for a conversational search. In one embodiment, the method includes monitoring a dialogue involving at least one user and capturing user utterances provided during the dialogue. These user utterances may then be analyzed and classified according to context of the dialogue. The dialogue context evolution may trigger recommendations based on be then intervened upon the determination that a user needs additional information and/or action to be taken may be needed based on the classified context and user utterances. The required information or action results may then be provided as a response back to the user. This information may be acquired by using a Documentation Recommendation Module. The Documentation Recommendation Module determines a resource's validity by a combination of said classified context and a resource that includes additional information.

In another embodiment, the recommended resources may be provided as part of an output of executing an API call which enables the construction of a URL for the user/customer.

Furthermore, the process can be enhanced by building a training process that will predict when a resource will be needed to assist the user in the future. This may be done by continuously monitoring the user utterances and establishing context categories for said utterances; and by recovering any existing previous utterances provided by the user in a previously captured and/or stored dialogue.

FIG. 1 provides an exemplary networked computer environment 100 in accordance with one embodiment. The networked computer environment 100 may include a computer 102 with a processor 104 and a data storage device 106, enabled to run a software program 108 and an automation search engine 110a. The networked computer environment 100 may also include a server 112, enabled to run a conversational search application or program 110b that may interact with a database 114 and a communication network 116. The networked computer environment 100 may include a plurality of computers 102 and servers 112, only one of which has been shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 9, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as an exclusive cloud, community cloud, public cloud, or hybrid cloud. Client computer 102 may be, for example, a mobile device, a telephone, a customized digital assistant, a netbook, a laptop computer, a tablet computer, a desktop computer, or any type of computing devices capable of running a program, accessing a network, and accessing a database 114. According to various implementations of the present embodiment, automated search engine or program 110a, and a conversational search application/program 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the engine/program 110a, 110b (respectively) to provide a task management technique. This technique will be provided in more detail below with respect to FIGS. 2 through 6.

Figure 2:
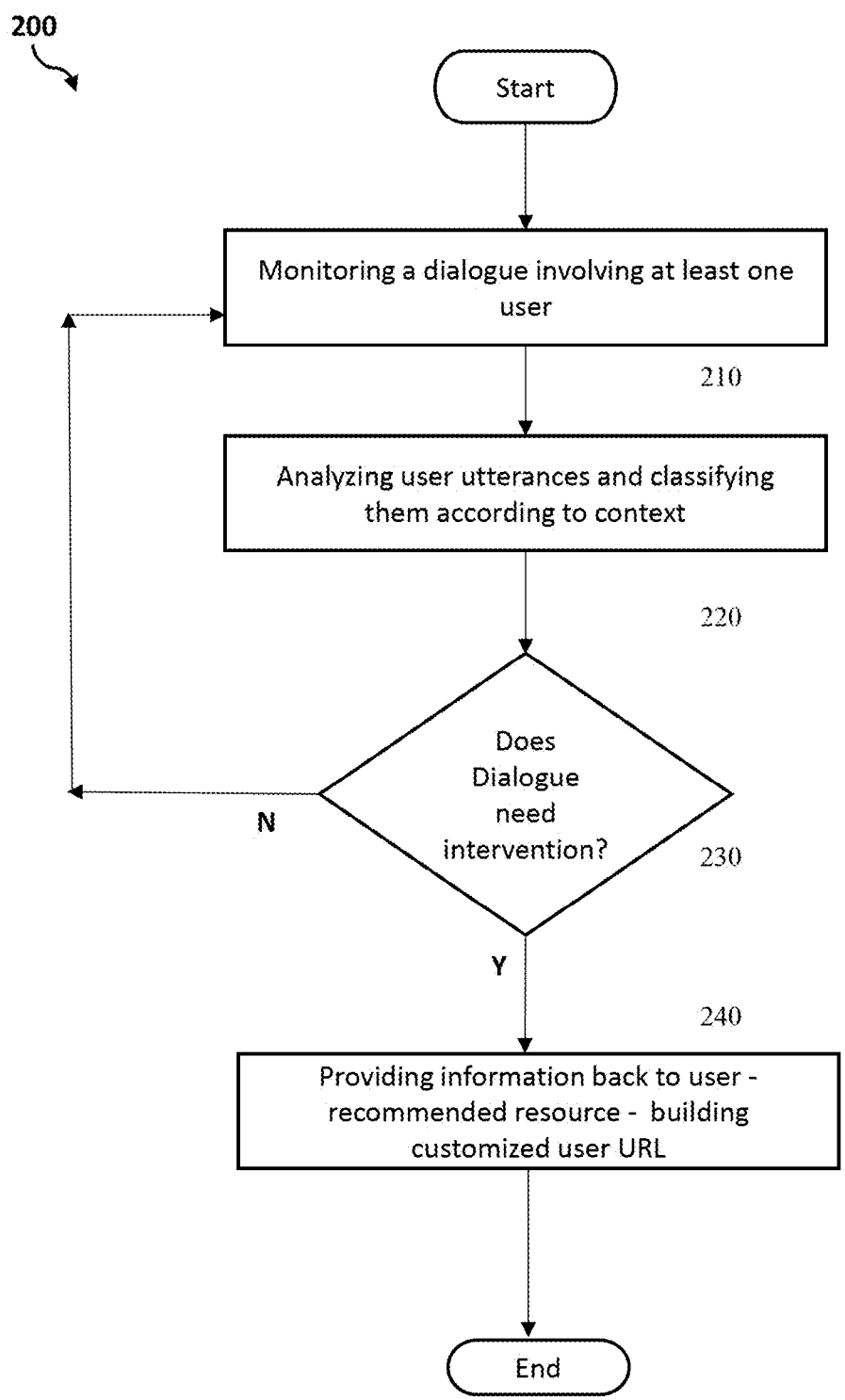
FIG. 2 provides a flowchart illustration of a method according to one embodiment.

FIG. 2 provides a flowchart illustration of one embodiment using conversational search techniques. The process of conducting this conversational search has been enumerated by numeral 200 in the figure and has several processing steps.

In step 210, a computer system monitors a dialogue involving at least a user or a customer during some time span. As can be appreciated by those skilled in the art, there may be a variety of ways that this conversation may be monitored. The user may customize such monitoring or in can be performed by the system automatically in different embodiment. In one example, a system may be responsible for managing such a conversation (typically provides a way to subscribe and/or be notified when the conversation evolves and publishes such notifications. This enables a third-party application to "monitor" the conversation.)

The user's dialogue may be defined as user interactions and can involve a variety of user utterances that can be both verbal and/or otherwise including but not limited to gestures, text, movement etc. The utterances may be obtained, at times stored either permanently or temporarily used for prediction of context and future interactions. The utterances may also be monitored to recognize when the user/customer may be making a request. Furthermore, these utterances may also be monitored and analyzed in cases where interference/intervention may be required to fulfill requests and to correct certain misinformation even without customer/user requests. An example that can be used, may be detection of user error or a need to provide help when the user may be stuck on a particular task.

In step 220, the user utterances may be analyzed and classified according to reviewing the context of the dialogue. In later processes (see FIG. 3), this process can eventually lead to predicting what resource the user may need based on history and the context of these utterances. The process of monitoring and analyzing may be interconnected. The analysis can establish what context entails and the inquiry that may be being made. For example, for a patient in a medical facility, the user may both want to ask about payment processing completion and medical procedure completion. Asking simply for process completion, however, can result in providing the patient the correct information if the automation engine can understand the context of the patient's inquiry. This was not achievable in current prior at.

In the prior art, different approaches had been taken that both lead to issues and errors. In the first scenario, agents and representatives open a customer's or user's account on behalf of the user/customer. In most instances, however, the agent has a reduced or even no-write type of permission. It should be noted that the agent can be a person or a part of an automated system like an Artificial Intelligence (AI) agent. In an alternate approach, agents may be provided templates with empty slots for URL query-parameters. These agents then extract these values from different outputs (like Application Processing Interface (API) outputs) and copy-paste them to construct these URLs. Both approaches may be time-consuming and risk-prone and/or error-prone.

In step 230, it may then be determined when and if there may be a need for the dialogue to be interrupted/intervened based on customer need or request as discussed earlier. Subsequently, this leads to determining the valid resource recommendation for the dialogue by classifying a combination of the context of a user's utterance and the content of a recommended resource. In one embodiment this includes determining whether to intervene in this dialogue by classifying the context of the dialogue using a Decision Module.

If at step 230, it may be determined that the dialogue needs to be interrupted/intervened based on customer request or need, then at step 240, information may be provided back to said user. In one embodiment, this may be accomplished using a Documentation Recommendation Module. In one embodiment, the Documentation Recommendation Module determines a valid resource recommendation may be determined by a combination of said classified context and a resource that includes additional information. In one embodiment, the resource provided may be a document recommended from the Document Recommendation Module. Once this has been obtained, an API call or another corresponding automated mechanism such as a Robotics Process Automation (RPA) action, may be executed. The latter may be associated with the resource/document. In one embodiment, once the information may be provided to the user—whether user initiated as a command or request, or alternatively provided uninitiated to help the user—a URL can be provided and customized for the user. The latter may be provided by using the recommended document, and the output from the RPA/API (to construct the customized URL for the user/customer.) If at step 230 it may be determined that the dialogue does not need to be interrupted/intervened upon based on a customer request or need, then at 21, the dialogue involving at least one user continues to be monitored.

Figure 3:
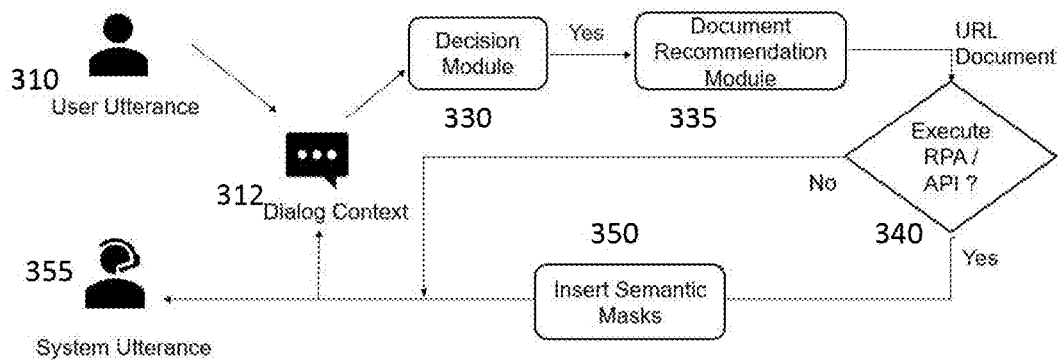
FIG. 3 provides a flowchart illustration of some of the details as depicted in the embodiment of FIG. 2.

FIG. 3 provides a block diagram illustrating some of the steps of FIG. 2 in more detail. In one embodiment, as shown in FIG. 3, the process of prediction may be performed by training the system on an on-going basis so that the user/customer needs may be anticipated with accuracy. This allows for a customized user experience. In this embodiment, the training will allow the predicting of an instance where a resource will be needed in the future to assist the user based on what may be currently happening in the dialogue evolution or overall process completion. This may be done by continuously monitoring user utterances and establishing context categories for these utterances. In addition, it may be possible to recover any existing previous utterances provided by the user in a previously captured and/or stored dialogue. In one embodiment, a user report can be established for different user utterances at different times. Similarly, user utterances of different users can be captured to facilitate understanding of context and classifying utterances in general.

The steps of FIG. 2 may be reflected in the illustration of FIG. 3. For example, as in FIG. 2 (step 210), user utterances may be monitored especially with respect to the dialogue context (shown at 310 and 312). Furthermore, like step 230 of FIG. 2, a Decision Module 330 may be used to determine that dialogue needs to be interrupted because of a request or a need for intervention. The difference provided in this context, as will be discussed presently, provides the ability to use the Decision Module (330) in training on an on-going basis to make these determinations based on dialogue collected continuously (and/or previously) based on a collection of user utterances and by associating and classifying these utterances based on context.

The Documentation Recommendation Module 335 then takes the need as determined by Decision Module 330 and the context of user utterances as classified, to further determine a valid resource recommendation. This validity of the resource may be made for the dialogue by classifying the combination of the context of the user utterance(s) and the content of the resource. As before, once the valid URL has been determined, an RPA/API action or call can then be executed in 340 to gather output used to fully construct the URL recommendation. The system will then provide a response back to the user in step 360 after checking one last time that the response should be provided based on user request/utterances context.

Furthermore, in step 350, semantic masks can be used such as for on-going training and as part of a final dialogue context check prior to providing the response or action back to the user/customer at 360. In one embodiment, masking URLs can be provided, especially to train the system. In this embodiment, for training models, semantic masks can be either created (one example in Python—using Spatial Model Editor and its interface—SME) or identified automatically by parsing (e.g., Query-Params). In such a scenario, during deployment, the parsing parameter values may be retrieved by agents from two sources: 1) User record (after agent kicks-off a REST API call to retrieve user records); and 2) Output—such as an RPA output (after agent executes an RPA based on user information). In other words, masking URLs may be performed during training and then mask replacement can be achieved during deployment using (Context/RPA) output.

Figure 4:
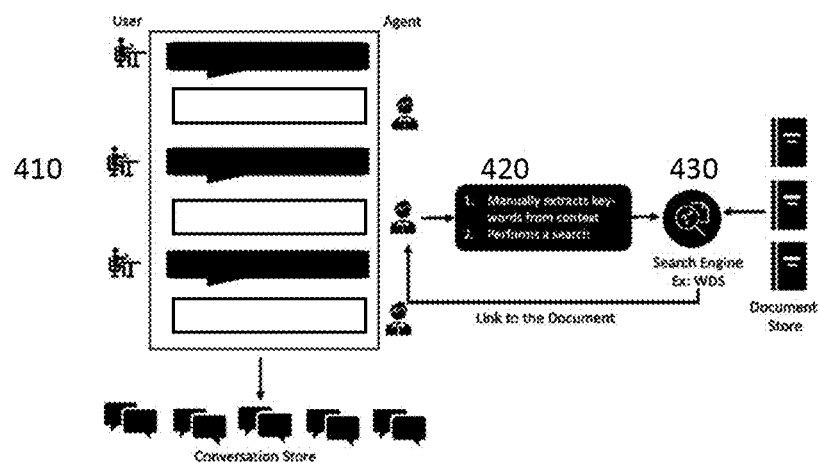
FIG. 4 provides a block diagram of a prior art illustration of a conversational search engine.
Figure 5:
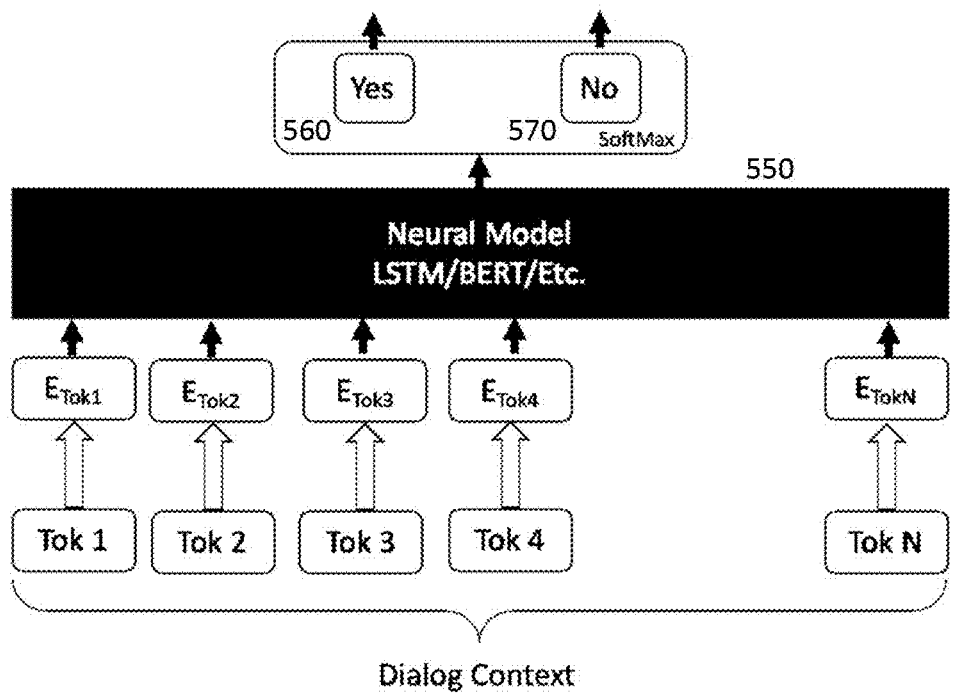
FIG. 5 illustrates a block diagram of a Decision Module according to one embodiment.
Figure 6:
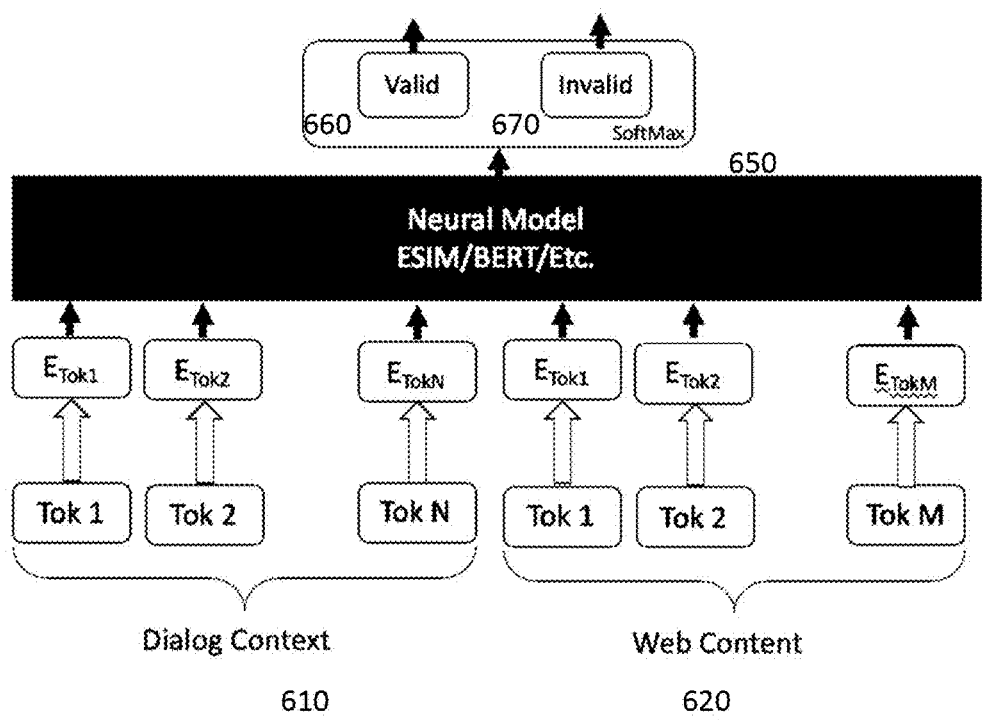
FIG. 6 illustrates a block diagram of a Document Recommendation Module according to one embodiment.

A couple of examples of the process implemented by the present invention have been provided in FIGS. 5 and 6. For comparison purposes, FIG. 4 provides a prior art depiction. In FIG. 4, as discussed previously Customer Care (CC) agents 410 use webpages/documents 420 containing domain knowledge to help users. As was previously discussed, in such scenarios agents often manually extract the keywords from the user utterances in the dialogue. In some embodiments, the agents or prior art automation can search a document store using internal search engines 430. A prior art technique that helped reduce agent's workload was to automate the process of identifying the supporting documents to assist the customer care (CC) agents by classifiers built based on input dialogue context. This may have worked well when the user's needs were common, and the classifiers would trigger document search based on either dialogue context/keywords from context that were similar in most searches. However, this would not work in many instances such as when the URLs were user specific, and their resulting documents were dynamically assembled using URL content.

In FIG. 5, some of the more specific components of the embodiments discussed in FIGS. 2 and 3 have been provided. FIG. 5 shows the Decision Module 550 (in this instance provided as a Neural Model) where the input may be the conversation and conversation contexts 510 (as a group) from the user/customer. The output 560/570 provided as a yes/no shows whether a document should be provided.

Furthermore, in this scenario, to train the Decision Module, the conversations were split from various positions where the next utterance may be made by the agent. Such cases include instances where the next utterance may be a document (counts as a positive example—Yes) and cases where the next utterance may be an agent utterance without a reference to a document (a negative example—No).

FIG. 6 provides another example of the modules discussed in FIGS. 2 and 3. FIG. 6 provides a more detailed illustration of Document Recommendation Module 650. In this embodiment, the input provided may be in the dialogue context but also the content of the documents provided as 610 and 620, respectively. The Document Recommendation Module in this embodiment treats the document prediction as a binary classification problem where each pair of dialogue context and document content can either be valid or invalid. This has been shown at the as the output 660/670. The documents may be ranked according to the probabilities of the classifier. In this scenario, when the RPA/API may be executed, the call associated with the URL document may also be executed based on the URL document selected. The Decision Module and Document Recommendation Module can also be trained jointly.

The scenarios discussed can be used with a variety of different devices. For example, in mobile devices, like the URL example provided, the address for a website or any other mobile indicated application can be provided similar to the URL address (for an application or app) on the mobile device. One examples may be that of mobile deep links. In cases where the mobile URLs follow a different format, it may be possible to build a mapping of the web URL to the mobile URL so based on the current user device (either desktop browser, mobile etc.), a recommendation can be provided either as to the web URL or to the corresponding mobile URL.

Figure 7:
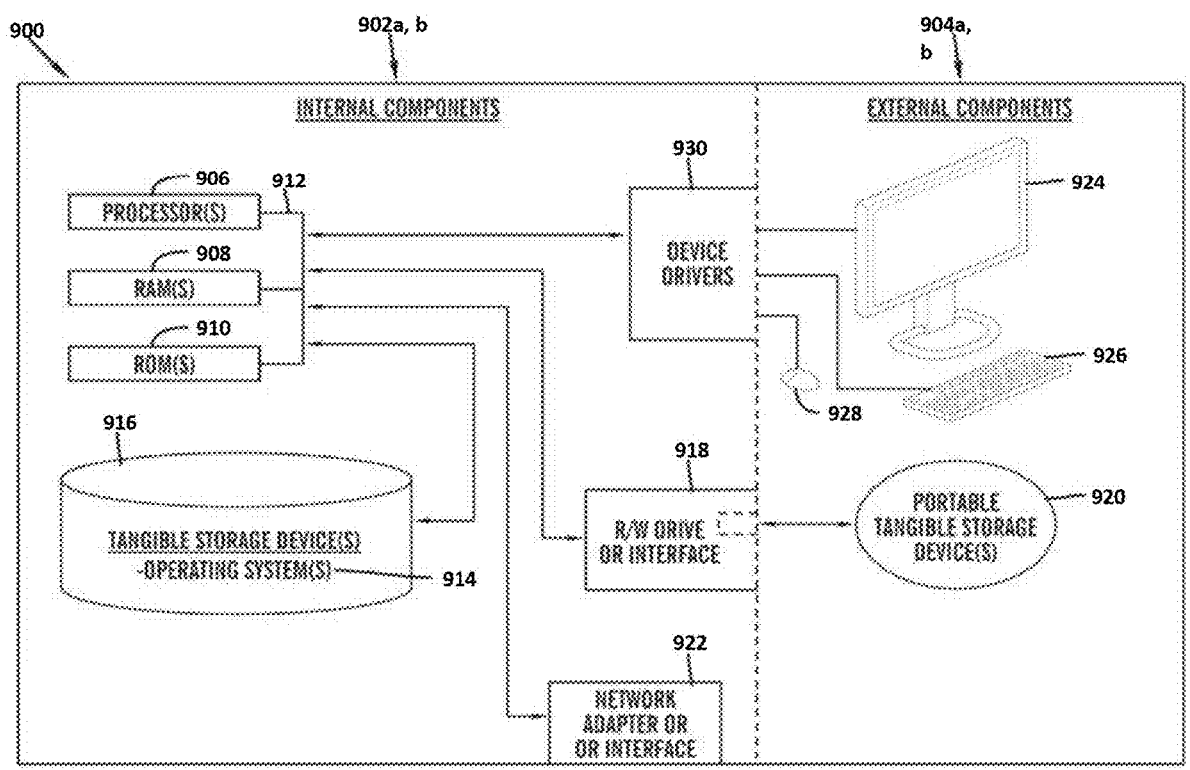
FIG. 7 provides a block diagram of internal and external components of computers and servers depicted in FIG. 1 according to at least one embodiment.

FIG. 7 provides a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 may be representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but may not be limited to, individual computer systems, server computer systems, thin clients, thick clients, hand-held or laptop devices, multiprocessor systems, microprocessor-based systems, network PCs, minicomputer systems, and distributed cloud computing environments that include any of the above systems or devices.

Figure 9:
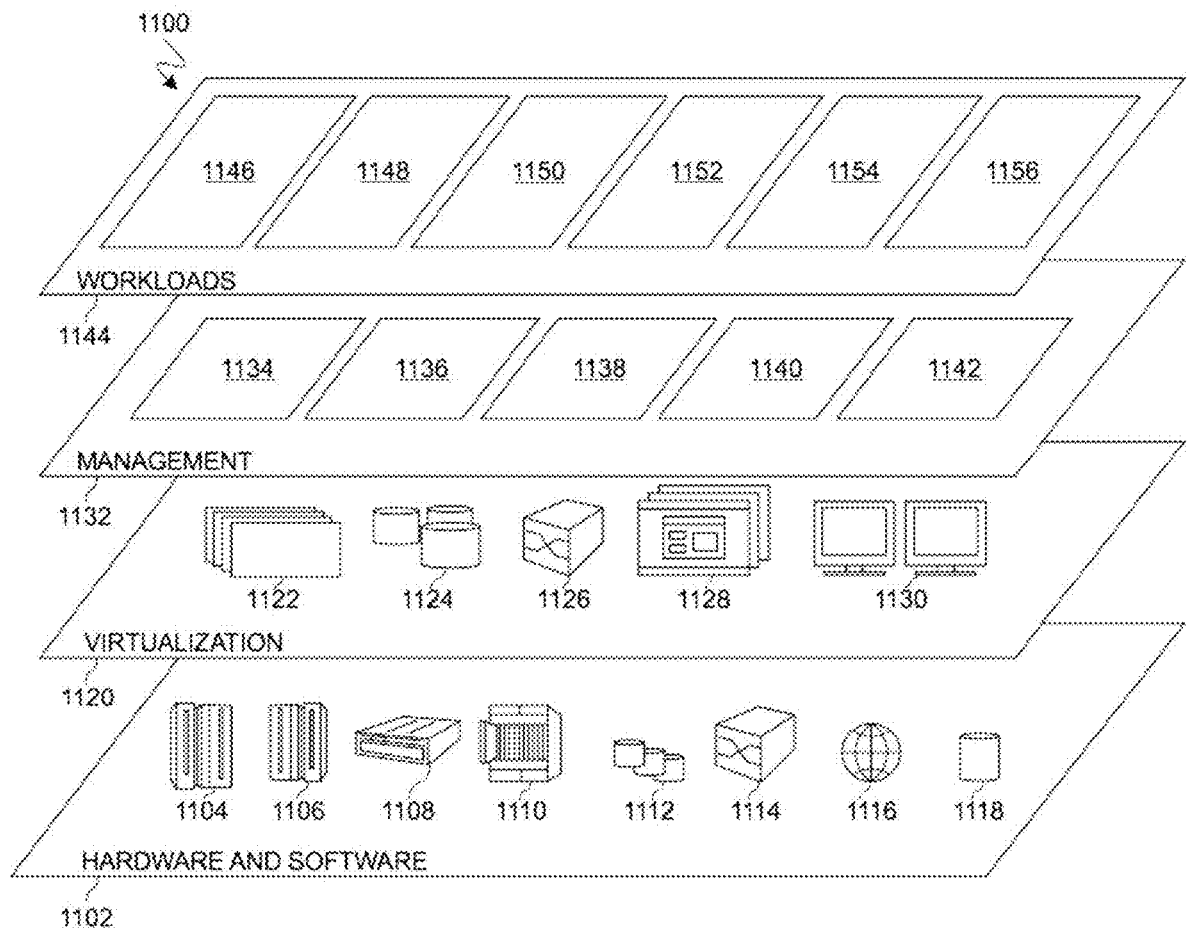
FIG. 9 provides a block diagram of functional layers of the illustrative cloud computing environment of FIG. 8, in accordance with an embodiment.

User client computer 102 and network server 112 may include respective sets of internal components 902 a, b and external components 904 a, b illustrated in FIG. 9. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the automated search/program 110a in client computer 102, and the conversational search program 110b in network server 112, may be stored on one or more computer-readable tangible storage devices 916 for execution by one or more processors 906 via one or more RAMs 908 (which typically include cache memory). In the embodiment illustrated in FIG. 9, each of the computer-readable tangible storage devices 916 may be a magnetic disk storage device of an internal hard drive. Alternatively, each of the computer-readable tangible storage devices 916 may be a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108, the automated engine/program 110a and conversational search program 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the automated engine/program 110a in client computer 102 and the conversational search program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the automated engine/program 110a in client computer 102 and the conversational search program 110b in network server computer 112 may be loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It should be understood in advance that although this disclosure includes a detailed description on cloud computing, implementation of the teachings recited herein may not be limited to a cloud computing environment. Rather, embodiments of the present invention may be capable of being implemented in conjunction with any other type of computing environment now known or later developed.

Cloud computing provides a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Cloud Model characteristics are as follows:
a. On-demand self-service: a cloud consumer can unilaterally provision computing capabilities, such as server time and network storage, as needed automatically without requiring human interaction with the service's provider.
b. Broad network access: capabilities are available over a network and accessed through standard mechanisms that promote use by heterogeneous thin or thick client platforms (e.g., mobile phones, laptops, and PDAs).
c. Resource pooling: the provider's computing resources are pooled to serve multiple consumers using a multi-tenant model, with different physical and virtual resources dynamically assigned and reassigned according to demand. There may be a sense of location independence in that the consumer generally has no control or knowledge over the exact location of the provided resources but may be able to specify location at a higher level of abstraction (e.g., country, state, or datacenter).
d. Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.
e. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Model characteristics are as follows:
f. Software as a Service (SaaS): the capability provided to the consumer may be such as to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.
g. Platform as a Service (PaaS): the capability provided to the consumer may be to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.
h. Infrastructure as a Service (IaaS): the capability provided to the consumer may be to provision processing, storage, networks, and other fundamental computing resources where the consumer may be able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Model characteristics are as follows:
i. Exclusive cloud: the cloud infrastructure may be operated solely for an organization. It may be managed by the organization or a third party and may exist on-premises or off-premises.
j. Community cloud: the cloud infrastructure may be shared by several organizations and supports a specific community that has shared concerns (e.g., mission, security requirements, policy, and compliance considerations). It may be managed by the organizations or a third party and may exist on-premises or off-premises.
k. Public cloud: the cloud infrastructure may be made available to the general public or a large industry group and may be owned by an organization selling cloud services.
l. Hybrid cloud: the cloud infrastructure may be a composition of two or more clouds (exclusive, community, or public) that remain unique entities but are bound together by standardized or proprietary technology that enables data and application portability (e.g., cloud bursting for load-balancing between clouds).

A cloud computing environment may be service oriented with a focus on statelessness, low coupling, modularity, and semantic interoperability. At the heart of cloud computing may be an infrastructure comprising a network of interconnected nodes.

Figure 8:
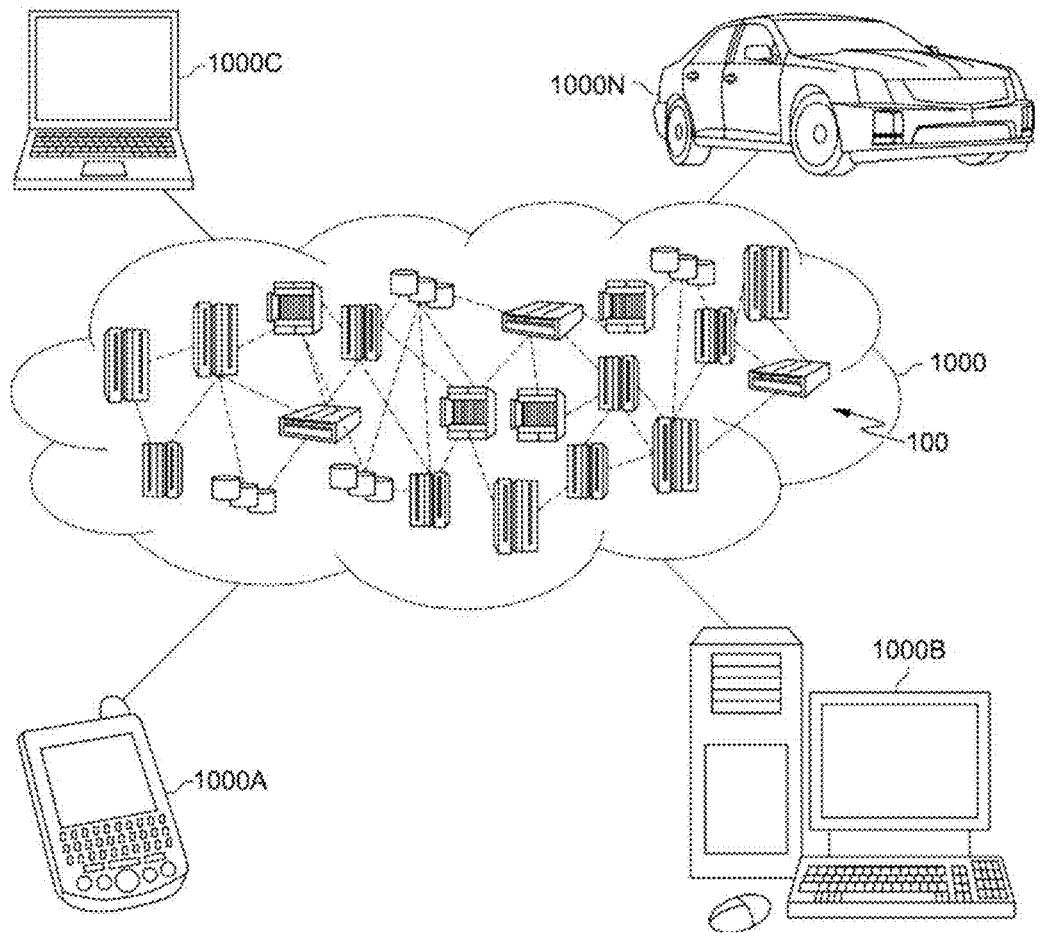
FIG. 8 provides a block diagram of an illustrative cloud computing environment including the computer system depicted in FIG. 1, in accordance with one embodiment.

Referring now to FIG. 8, illustrative cloud computing environment 1000 may be depicted. As shown, cloud computing environment 1000 comprises one or more cloud computing nodes 100 with which local computing devices used by cloud consumers, such as, for example, digital assistants (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as exclusive, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It may be understood that the types of computing devices 1000A-N shown in FIG. 8 are intended to be illustrative only and that computing nodes 100 and cloud computing environment 1000 can communicate with any type of computerized device over any type of network and/or network addressable connection (e.g., using a web browser).

Referring now to FIG. 9, a set of functional abstraction layers 1100 provided by cloud computing environment 1000 has been shown. It should be understood in advance that the components, layers, and functions shown in FIG. 9 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual exclusive networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement may be anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and data management 1156.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for conducting a conversational search comprising: monitoring a dialogue involving at least one user and capturing a plurality of utterances by a user provided during said dialogue;
   analyzing said user utterances and classifying them according to a context of said dialogue;
   intervening in said dialogue upon determining that said user needs additional information, based on the plurality of user utterances, and said context; wherein the intervening is by analyzing said dialogue to determine a need for further assistance; recovering any existing previous utterances as provided by said user in a previously stored in a user record previously established;
   providing information back to said user using a Documentation Recommendation Module, wherein said Documentation Recommendation Module determines a valid resource recommendation by a combination of said context and a resource that includes additional information; and
   predicting when a resource recommendation is needed by monitoring user utterances, wherein said predicting is made by an artificial intelligence trained to analyze said user utterances and any previous user utterances; wherein said artificial intelligence is configured to establish context categories according to context of dialogue provided based on one or more current user utterances or previously uttered stored utterances.

2. The method of claim 1, wherein determining that the user needs additional information is performed by using a Decision Module.

3. The method of claim 2, wherein said classifying said user utterances is performed by using said Decision Module.

4. The method of claim 1, wherein said resource includes at least one recommended document.

5. The method of claim 1, further comprising:
   executing an Application Programming Interface (API) call; and
   providing a customized URL as a response back to said user by using said resource provided by said Documentation recommendation Module.

6. The method of claim 5, wherein instead of an API call a Robotics Process Automation (RPA) action is performed.

7. The method of claim 6, wherein said resource is used with an output generated by said RPA action associated with said resource, in constructing said customized URL.

8. The method of claim 5, wherein providing a URL includes building a customized URL for said user; wherein said resource is used with an output generated by said API in building said customized URL.

9. The method of claim 1, wherein said user utterances are verbal or communicated via text, gestures and/or movements of said user or objects.

10. The method of claim 1, further comprising: predicting a resource will be needed to assist said user at a future point in time by continuously monitoring said user utterances and establishing a plurality of context categories for said utterances.

11. The method of claim 6, wherein a semantic mask is created for providing continued learning to enable resource and user need predicting.

12. The method of claim 8, wherein said semantic mask is identified automatically by parsing Query-Params.

13. A computer system, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method for conducting a conversational search comprising:
monitoring a dialogue involving at least one user and capturing a plurality of utterances by a user provided during said dialogue;
analyzing said user utterances and classifying them according to a context of said dialogue;
intervening in said dialogue upon determining that said user needs additional information, based on the plurality of user utterances, and said context; wherein the intervening is by analyzing said dialogue to determine a need for further assistance;
recovering any existing previous utterances as provided by said user in a previously stored in a user record previously established;
providing information back to said user using a Documentation Recommendation Module, wherein said Documentation Recommendation Module determines a valid resource recommendation by a combination of said context and a resource that includes additional information; and
predicting when a resource recommendation is needed by monitoring user utterances, wherein said predicting is made by an artificial intelligence trained to analyze said user utterances and any previous user utterances; wherein said artificial intelligence is configured to establish context categories according to context of dialogue provided based on one or more current user utterances or previously uttered stored utterances.

14. The computer system of claim 13, further comprising:
executing an Application Programming Interface (API) call; and
providing a customized URL in said response back to said user by using said resource provided by said Documentation recommendation Module, wherein said resource is used with an output generated by said API in building said customized URL.

15. The computer system of claim 13, further comprising: predicting a resource will be needed to assist said user in future by continuously monitoring said user utterances and establishing context categories for said utterances.

16. The computer system of claim 13, wherein a semantic mask is created for providing continued learning to enable resource and user need predicting.

17. A computer program product, comprising: one or more non-transitory computer-readable storage media and program instructions stored on at least one of the one or more tangible storage media, the program instructions executable by a processor to cause the processor to perform a method comprising:
monitoring a dialogue involving at least one user and capturing a plurality of utterances by a user provided during said dialogue;
analyzing said user utterances and classifying them according to a context of said dialogue;
intervening in said dialogue upon determining that said user needs additional information, based on the plurality of user utterances, and said context; wherein the intervening is by analyzing said dialogue to determine a need for further assistance and/or by a user request;
recovering any existing previous utterances as provided by said user in a previously stored in a user record previously established;
providing information back to said user using a Documentation Recommendation Module, wherein said Documentation Recommendation Module determines a valid resource recommendation by a combination of said context and a resource that includes additional information; and
predicting when a resource recommendation is needed by monitoring user utterances, wherein said predicting is made by an artificial intelligence trained to analyze said user utterances and any previous user utterances; wherein said artificial intelligence is configured to establish context categories according to context of dialogue provided based on one or more current user utterances or previously uttered stored utterances.

18. The computer program product of claim 17, further comprising:
predicting a resource will be needed to assist said user at a future point in time by continuously monitoring said user utterances and establishing a plurality of context categories for said utterances.

* * * * *